United States Patent [19]
Wilke et al.

[11] 3,942,846
[45] Mar. 9, 1976

[54] BALL RACE

[76] Inventors: Richard Wilke, Am Weissenfeld 4, 583 Schwelm; Helmut Korthaus, Fernblick 3, 56 Wuppertal-Barmen, both of Germany

[22] Filed: Dec. 2, 1974

[21] Appl. No.: 528,895

[30]  Foreign Application Priority Data
   Nov. 30, 1973  Germany............................ 2359678

[52] U.S. Cl................................................ 308/6 C
[51] Int. Cl.².......................................... F16C 17/00
[58] Field of Search........ 308/6 C, 189 R, 195, 196, 308/207 R, 216, 188

[56]  References Cited
    UNITED STATES PATENTS

| | | | |
|---|---|---|---|
| 2,895,343 | 7/1959 | Orner................................... | 74/459 |
| 3,261,224 | 7/1966 | Anthony............................... | 74/459 |
| 3,512,426 | 5/1970 | Dabringhaus......................... | 74/459 |
| 3,815,435 | 6/1974 | Eschenbacher...................... | 74/459 |

*Primary Examiner*—John J. Love
*Attorney, Agent, or Firm*—Ernest G. Montague; Karl F. Ross; Herbert Dubno

[57] ABSTRACT

Two relatively movable bodies, such as a screw and a nut, engage each other through the intermediary of an endless row of balls guided in a closed guide path including a groove formed in a surface of one body confronting the other body. The guide path further includes at least one substantially prismatic bridge piece inserted in the grooved body and formed with an open-ended recess generally perpendicular to the groove, this recess communicating with one end of that groove and either with the opposite end of the same groove or with a corresponding end of a companion groove. The parallel end faces of the bridge piece are flush with opposite surfaces of the grooved body and, in the specific instances here described, are inclined with reference to the direction of the recess.

4 Claims, 5 Drawing Figures

BALL RACE

FIELD OF THE INVENTION

Our present invention relates to a ball race designed to facilitate relative motion between two bodies with closely spaced, parallel bearing surfaces, with maintenance of a predetermined distance between these surfaces, under conditions of minimum frictional resistance.

BACKGROUND OF THE INVENTION

A system of this general type has been disclosed in U.S. Pat. No. 3,771,382 granted to one of us, Richard Wilke, on Nov. 13, 1973. In that system the two bodies to be relatively displaced are a nut and a screw or spindle, the latter being formed with a thread in the shape of multi-turn helical grooving whereas the nut is provided with a similar groove forming an incomplete helical turn of the same pitch. The groove of the nut is complemented by a cylindrical insert in the nut body, provided with a diametrical recess, to form a closed guide path for an endless series of balls which (except during their passage through the recess of the insert) are received partly in the groove of the nut and partly in a confronting turn of the spindle grooving to act as spacers, the balls being freely movable along their guide path in either direction.

While the system of the prior patent is eminently suitable for spindles and nuts with threads of relatively short pitch compared to their diameter, threads of larger pitch and therefore larger helix angle can be accommodated only with difficulty since this necessitates an increase in the diameter of the insert and with it an enlargement of both the axial length and the thickness of the nut in order to preserve structural continuity.

OBJECTS OF THE INVENTION

An important object of our present invention, therefore, is to provide an improved ball race for an assembly of this type in which that inconvenience is avoided even with threads of a large helix angle.

Another object is to provide a ball race adapted to be used for maintaining low-friction contact between two bodies moving linearly with reference to each other, with either curved or flat bearing surfaces held separated by the balls.

SUMMARY OF THE INVENTION

These objects are realized, in conformity with our present invention, by providing one of the two coacting bodies (specifically the nut in the case of an assembly of the type disclosed in U.S. Pat. No. 3,771,382) with an elongate cutout opening onto the bearing surface of this body, an elongate bridge piece or key being matingly received in this cutout and having substantially parallel end faces located at and preferably flush with opposite body surfaces (one of which may be its bearing surface). The bridge piece, which may be held in the cutout by cementing to the body or by other fastening means, has an open-ended recess which differs from that of the cylindrical insert of the prior patent in that its principal dimension is generally perpendicular to a groove formed on the bearing surface of this body as part of a looped trackway which terminates near opposite ends of the cutout so as to be complemented to a closed guide path by that recess. In a nut-and-spindle assembly of this description, the end faces are transverse to the spindle axis.

A ball race of this description can also be used on a first body linearly movable with reference to a second body whose bearing surface in this instance need not be grooved. In such a case, pursuant to another feature of our invention, the looped trackway includes two parallel grooves formed in the first body, one groove being again provided in its bearing surface while the other groove is disposed remote from that surface, generally on an opposite body surface. Ths closed guide path then comprises a pair of substantially symmetrical key-shaped bridge pieces of the aforedescribed structure received in respective cutouts of the first body and interconnecting opposite ends of the two grooves by their recesses; here, too, the balls can freely circulate in either direction along their guide path.

Advantageously, the bridge pieces and their recesses are so oriented that their principal dimensions are skew to the direction of relative displacement of the bodies as determined either by a grooving of the bearing surface of the second body or by other guide means. Such an orientation, which in the case of a substantially prismatic bridge piece results in an inclination of its end faces to the principal dimension of its recess (the same as in the aforedescribed spindle-and-nut assembly), increases the separation of the parallel grooves of the guide path and therefore facilitates a smoother transition of the balls therebetween via the curved recesses of the bridge pieces forming the vertices of that path.

BRIEF DESCRIPTION OF THE DRAWING

The above and other features of our invention will now be described in detail with reference to the accompanying drawing in which.

SPECIFIC DESCRIPTION

Figure 1:
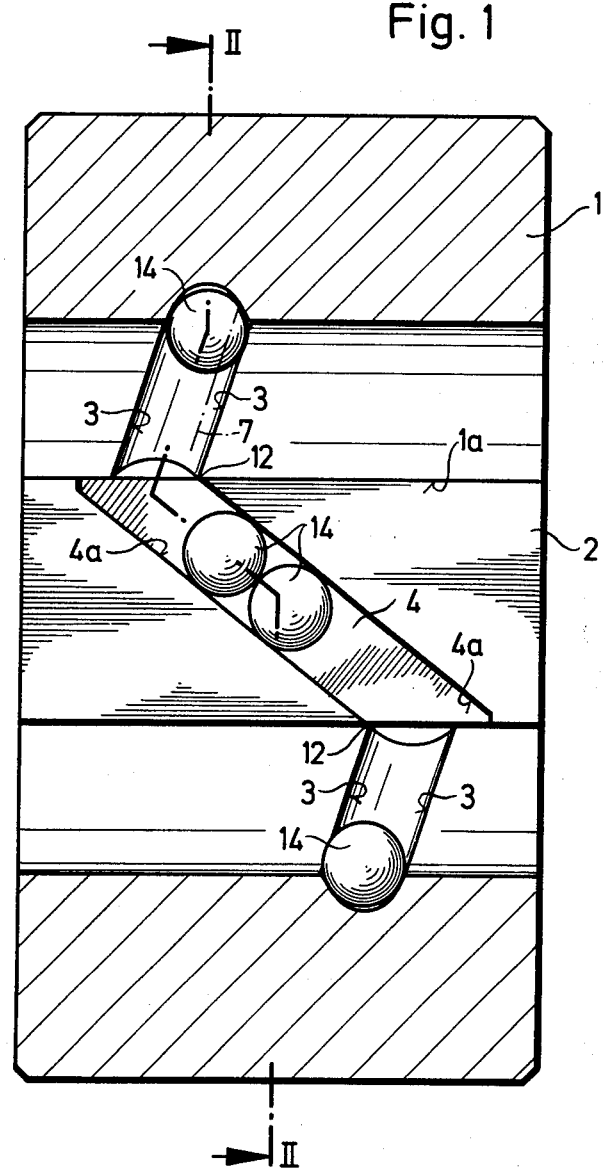
FIG. 1 is an axial sectional view, taken on the line I—I of FIG. 2, of a nut provided with a ball race embodying our invention.
Figure 2:
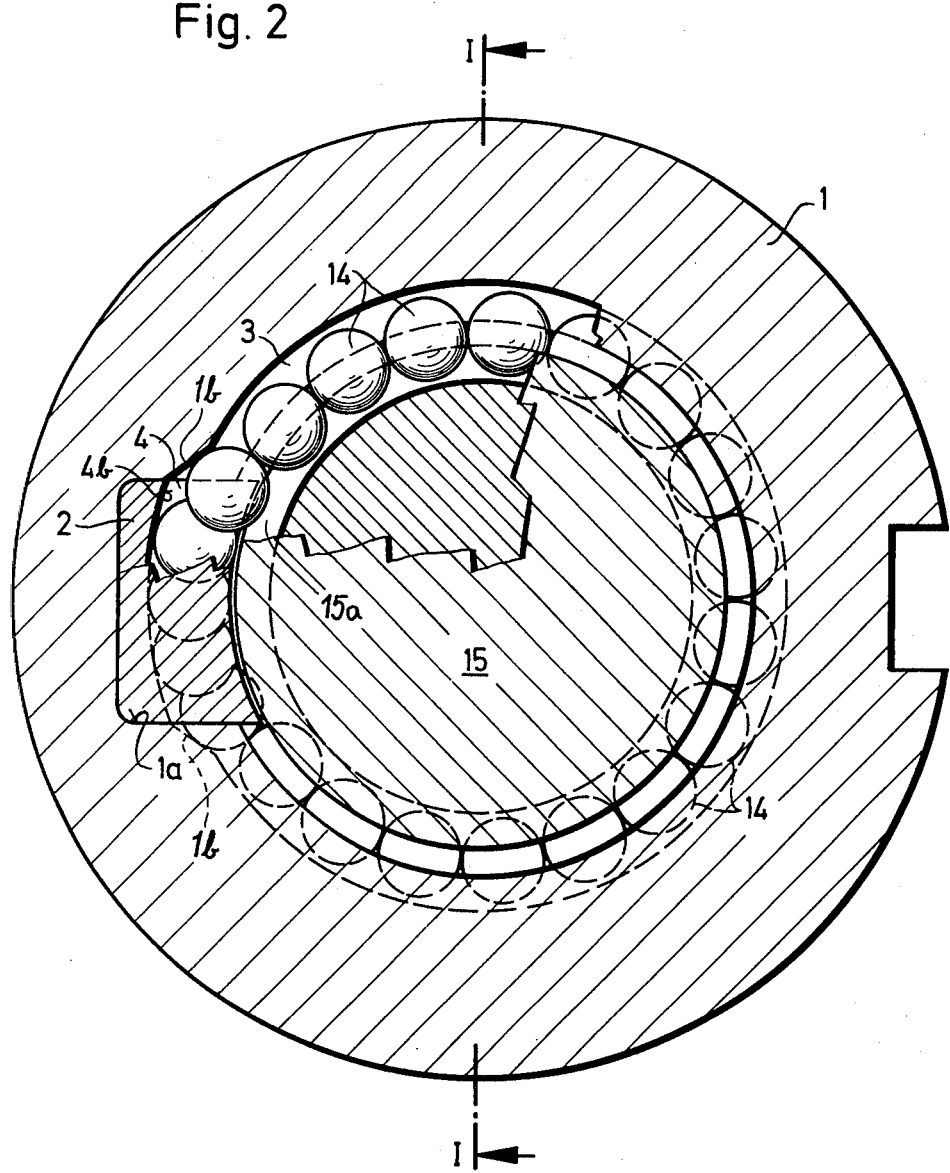
FIG. 2 is a cross-sectional view of a combination of the nut of FIG. 1 with a spindle taken on the line II—II of FIG. 1.
Figure 3:
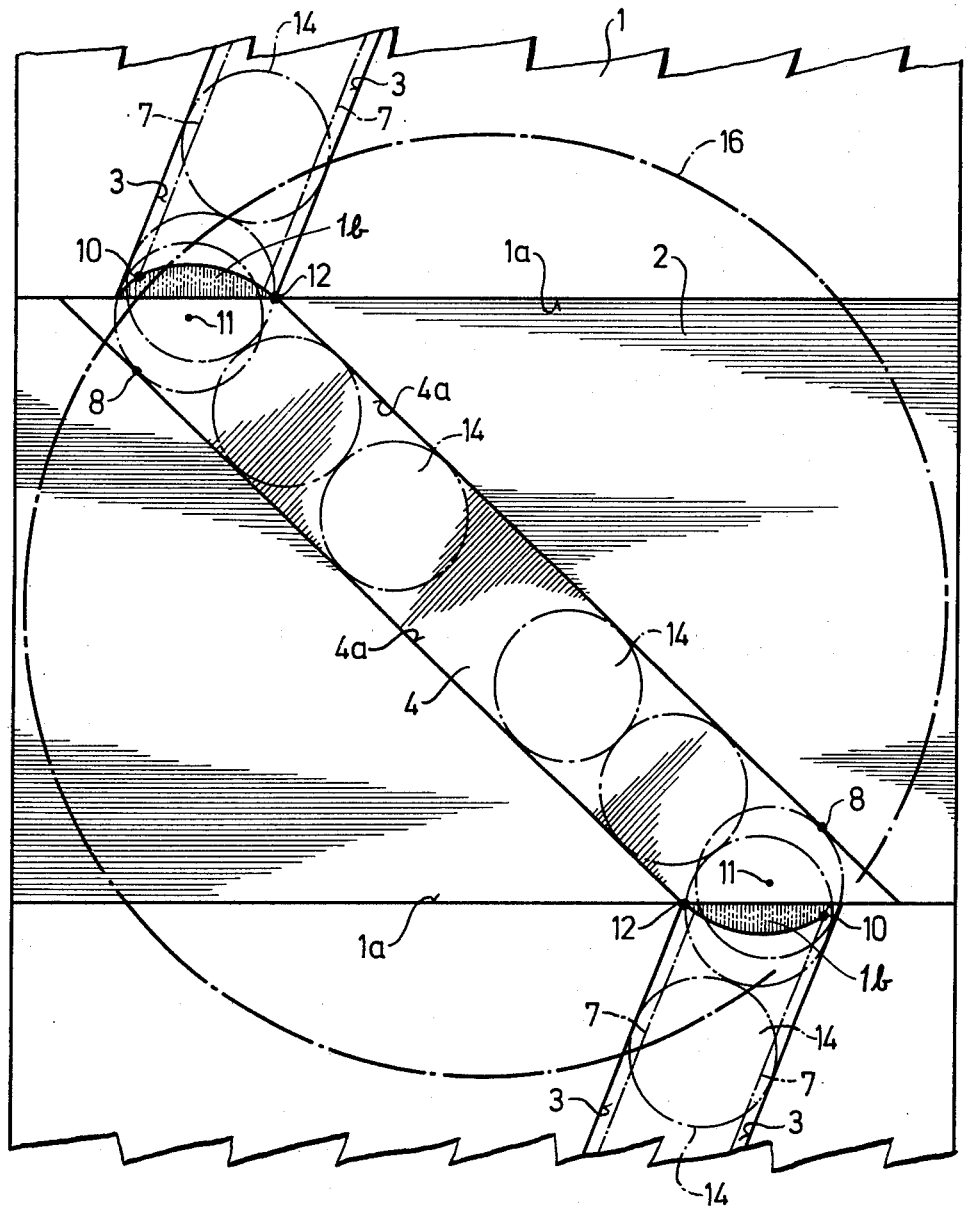
FIG. 3 is a somewhat diagrammatic view of an enlarged portion of the inner nut surface visible in FIG. 1.

Reference will first be made to FIGS. 1–3 showing a spindle-and-nut assembly embodying our invention. For convenience of comparison, the same references have been used in these Figures as in prior U.S. Pat. No. 3,771,382 to designate corresponding elements.

The inner peripheral surface of a nut 1, constituting its bearing surface, is formed with a helical groove 3 extending over not quite a full turn. Groove 3, defining a looped trackway for a series of balls 14 whose diameter substantially exceeds the depth of the groove, terminates at opposite longitudinal edges of a prismatic cutout 1a of nut 1 extending over the full axial length thereof, this cutout 1a accommodating a key-type bridge piece 2 secured therein by suitable means. The end faces of bridge piece 2 are flush with those of nut 1; one of these end faces, however, could also be provided with a shoulder resting against the nut face to ensure precise positioning of the key 2 in its cutout 1a. An oblique recess 4 in the key 2 communicates with the groove 3 near opposite ends of that key, the edges 4a of that recess forming corners 12 with respective edges of groove 3 which they adjoin at an obtuse angle only slightly greater than 90°. It will be noted that, contrary to the similarly designated insert piece of prior U.S. Pat. No. 3,771,382, key 2 need not be cut away in the vicinity of its edges to broaden the recess 4 at its junction with the respective extremities of groove 3.

Recess 4, whose curved bottom 4b is visible in FIG. 2, has a depth greater than that of groove 3 to enable the balls 14 to clear the raised land or ridge 15a separating adjacent depressed turns of a helical grooving of the associated screw or spindle 15, this grooving being also partly visible in FIG. 2 which shows the balls 14 projecting into it everywhere except on the short section of their closed guide path represented by recess 4. For smooth transition, nut 1 is beveled at 1b adjacent the entrance and exit points of recess 4, this beveled zone being also visible in FIG. 3 which shows the arcuate boundary thereof intersecting at 10 a longitudinal bearing line 7 of groove 3. This arcuate boundary thus constitutes the perimeter of the entrance or exit section of groove 3, a ball passing through that section coming to rest at a point 8 on the confronting edge 4a of recess 4 while touching the bottom 4b of that recess at a point 11.

As clearly shown in the drawing, recess 4 is of constant width and depth substantially equal to the diameter of the balls 14. Thus, the shallower and narrower groove 3 deepens at 1b to the level of the bottom 4b of the recess seen in FIG. 2 to lie on a cylindrical surface centered on the spindle axis whereas its lateral boundaries 4a are seen in FIGS. 1 and 3 to lie in parallel planes skew to that axis.

At 16 we have indicated in FIG. 3 the outline of a cylindrical insert that would have to be provided if the ball race were to be constructed in accordance with the teachings of prior U.S. Pat. No. 3,771,382. It will be immediately apparent that such a large insert would greatly weaken the structure of nut 1 unless the same were considerably enlarged. This is due, of course, to the fact that the helix angle of groove 3 in the illustrated embodiment of our invention is considerably larger than that in the prior patent in which the angle at corner 12 greatly exceeds that shown in present FIGS. 1 and 3, with the transverse separation of the extremities of groove 3 amounting to only a fraction of the groove width rather than several times that width as in the present instance.

The shape of zone 1b is not critical; instead of being ground to a flat bevel, it could also be milled with a concave curvature. Since the balls passing through recess 4 are propelled only by a relatively weak inertial force (it being understood that these balls are not tightly packed along their path), not much pressure is exerted by them upon the edges 4a of recess 4 so that key 2 can be held in position by simple means such as cementing.

Figure 5:
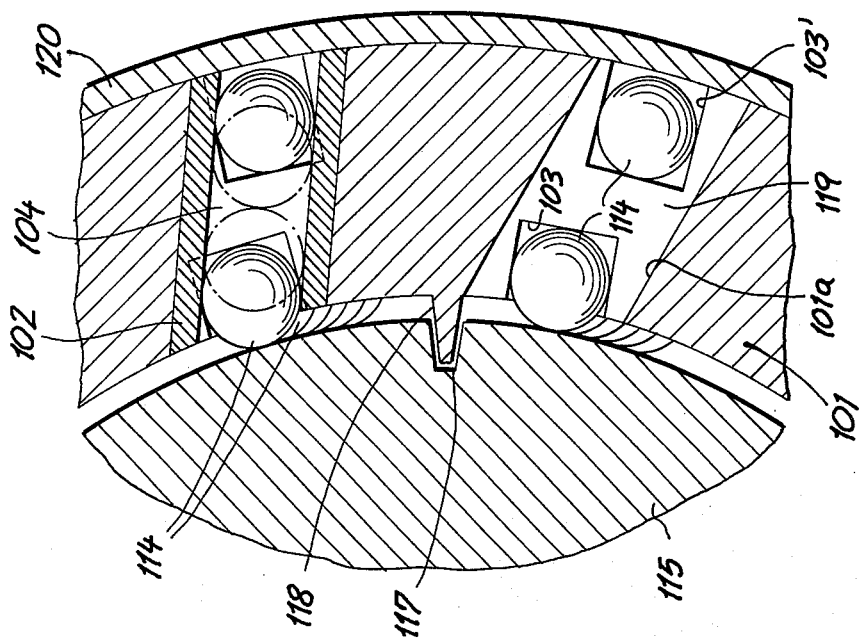
FIG. 5 is a cross-sectional view, taken on the line V—V of FIG. 4, of part of the guide tube in combination with the associated rod.
Figure 4:
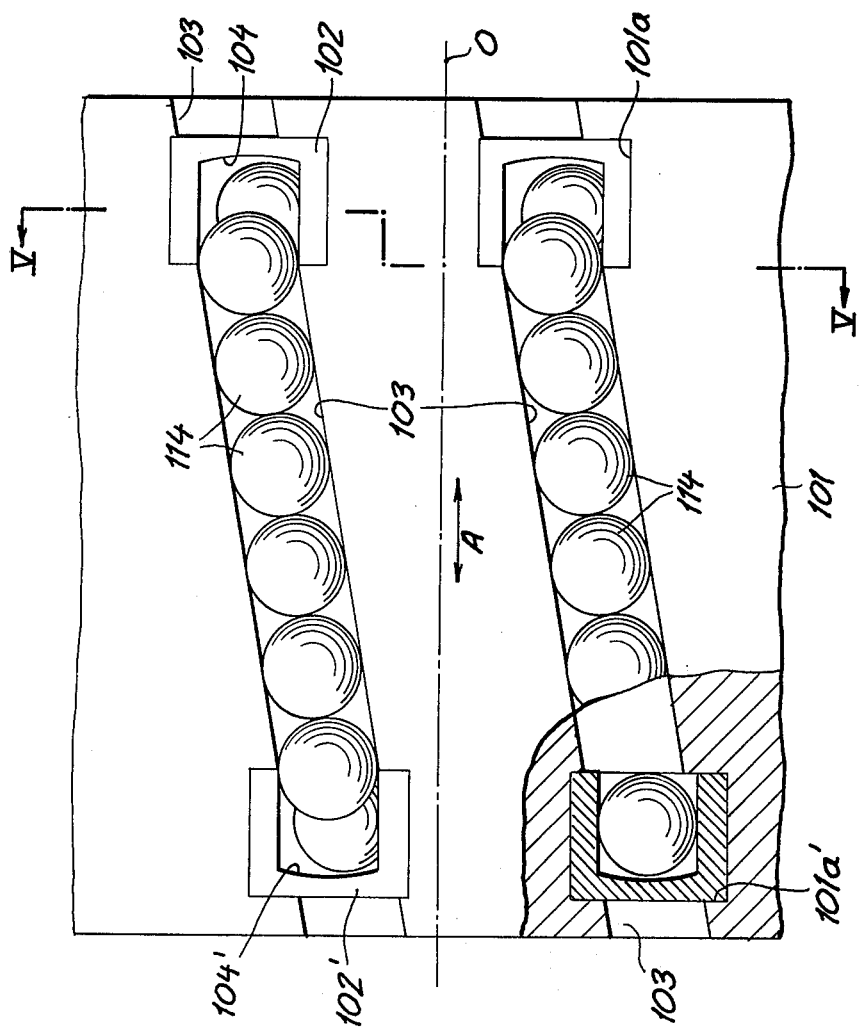
FIG. 4 is a fragmentary view, somewhat similar to that of FIG. 3, of an inner bearing surface of a guide tube for a cylindrical rod not shown in this Figure, the tube incorporating several ball races according to our invention.

In FIGS. 4 and 5 we have shown two coaxial bodies 101, 115 which are relatively slidable along their axis 0 as indicated by an arrow A in FIG. 4, body 101 being a guide tube for a cylindrical rod 115 surrounded thereby. At angularly equispaced locations the tube 101 is provided with an inner groove 104 and a parallel outer groove 103', these grooves being interlinked by two substantially symmetrical keys 102, 102' with confronting recesses 104, 104' received in respective cutouts 101a, 101a'. Each pair of grooves 103, 103' and recesses 104, 104' forms a closed guide path for a set of balls 114 which, as in the preceding embodiment, are free to circulate in either direction along their guide path.

The balls occupying the inner groove 103 contact the bearing surface of rod 115 which has been shown as smooth, except for a channel 117 engaged by a coacting rib 118 on tube 101 to maintain relative angular alignment between the rod and the tube. As best seen in FIG. 4, the grooves 103 (as well as 103') lie skew to the axis 0 and include a small angle with the direction of displacement A, thereby preventing a scoring of the rod surface as would occur in prolonged use if the grooves extended axially; the grooves therefore deviate somewhat from precise linearity. It will be understood, however, that the surface of rod 115 could also be grooved to receive part of the projecting portions of balls 114 in approximately the same manner in which this is done by the grooving of spindle 15 in FIG. 2. In that case the guide means 117, 118 will not be required. Naturally, the grooves on the rod should then extend axially unless it were desired to impart a certain rotary motion to that rod as it slides relatively to tube 101 in the direction of arrow A.

Furthermore, the cutouts 101a and 101a' also have their principal dimensions oriented skew to the axis 0 so that their recesses 104 lie in nonradial planes, thereby affording greater separation of grooves 103 and 103' so as to allow an increase in the radius of curvature of the recess bottom 104 required to let the balls clear the intervening web 119. For easier machining, the grooves 103 and 103' extend across the full axial length of tube 101, continuing beyond the cutouts 101a to the end faces of the tube.

Tube 101 is surrounded by an outer shell 120 closing the grooves 103' to the outside. The configuration of the ball race just described is independent of the radius of curvature of the closely spaced bearing surfaces of tube 101 and rod 115. Thus, in a limiting case, this radius may become infinite with the rod and the tube becoming prismatic instead of cylindrical, or with replacement thereof by a pair of parallel plates. In each instance, the high mobility of the balls 114 along their guide track and the absence of any close confinement of these balls, except on their run along inner grooves 103, affords reduced frictional resistance compared with a system in which each set of balls were lodged in a single straight groove closed at its ends.

Although the grooves 103, 103' have been shown rectangular in cross-section, it will be understood that they could be given a generally trapezoidal profile so as to contact the groove walls only along elevated bearing lines as shown at 7 in FIG. 3.

I claim:
1. A ball-bearing assembly comprising:
   a screw with a helical thread formed by depressed turns separated by ridges;
   a nut coaxially surrounding said screw, said nut having an inner surface provided with an elongate cutout bounded by edges parallel to the screw axis and with a helical groove of the same pitch as said thread, said cutout spanning a pair of adjacent turns of said thread, said groove forming a looped trackway terminating at said parallel edges;

an elongate bridge piece matingly received in said cutout and provided with an open-ended recess of constant width and depth communicating with said groove and complementing said trackway to a closed guide path, said recess having lateral boundaries in parallel planes skew to the screw axis; and an endless series of balls adjoining one another along said guide path with freedom of bidirectional movement through said groove, said balls being of like diameter substantially equaling the depth and width of said recess but larger than the depth and width of said groove whereby the balls passing through said groove project from said inner surface into turns of said thread aligned therewith;

said groove deepening at said parallel edges to the level of the bottom of said recess for facilitating the transition of said balls between said adjacent turns across the intervening ridge.

2. An assembly as defined in claim 1 wherein said groove is generally perpendicular to the principal dimension of said recess, the ends of said groove at said parallel edges being offset from each other by an axial distance equal to at least twice the width of said groove.

3. An assembly as defined in claim 1 wherein said bridge piece is substantially prismatic and extends across the full axial width of said nut.

4. An assembly as defined in claim 1 wherein the ends of said groove slope gradually toward the bottom of said recess.

* * * * *